(12) United States Patent
Kim et al.

(10) Patent No.: US 9,964,686 B2
(45) Date of Patent: May 8, 2018

(54) DISPLAY APPARATUS

(71) Applicant: Samsung Display Co., Ltd., Yongin-Si, Gyeonggi-Do (KR)

(72) Inventors: Youra Kim, Seoul (KR); Donghoon Kim, Suwon-si (KR); Junwoo You, Seongnam-si (KR); Hyun-hwa Song, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 15/398,037

(22) Filed: Jan. 4, 2017

(65) Prior Publication Data

US 2017/0299796 A1 Oct. 19, 2017

(30) Foreign Application Priority Data

Apr. 19, 2016 (KR) ........................ 10-2016-0047771

(51) Int. Cl.
*G02F 1/1335* (2006.01)
*F21V 8/00* (2006.01)
(Continued)

(52) U.S. Cl.
CPC ..... *G02B 6/0053* (2013.01); *G02F 1/133617* (2013.01); *G02F 1/133621* (2013.01); *G02F 1/1368* (2013.01); *G02F 1/134309* (2013.01); *G02F 1/136213* (2013.01); *G02F 1/136286* (2013.01); *G02F 2001/133607* (2013.01); *G02F 2001/133614* (2013.01); *G02F 2201/121* (2013.01); *G02F 2201/123* (2013.01); *G02F 2202/36* (2013.01); *G02F 2203/05* (2013.01)

(58) Field of Classification Search
CPC ........ G02B 6/0053; G02B 2006/12114; G02F 1/133617; G02F 1/133621; G02F 1/134309; G02F 1/136213; G02F 1/136286; G02F 1/1368; G02F 2001/133614; G02F 2201/121; G02F 2201/123; G02F 2202/36; G02F 2203/05
See application file for complete search history.

(56) References Cited

U.S. PATENT DOCUMENTS 5,467,417 A 11/1995 Nakamura et al.
7,538,851 B2 5/2009 Chen et al.
(Continued)

FOREIGN PATENT DOCUMENTS

KR 1020100074471 A 7/2010
KR 101045261 B1 6/2011
KR 1020150026044 A 3/2015

*Primary Examiner* — Nathanael R Briggs
(74) *Attorney, Agent, or Firm* — Cantor Colburn LLP

(57) ABSTRACT

A display apparatus includes a plurality of prism patterns disposed between a display panel and a light guide plate and having a shape of an inverted triangle, each of the plurality of prism patterns including a first pattern including a first side having a shape of an inverted triangle, which faces the display panel, a second side connecting one end of the first side to a vertex of the inverted triangle disposed under the first side, and a third side connecting the other end of the inverted triangle to the vertex and a second pattern having a refractive index less than that of the first pattern and disposed in the first groove that is defined in the second side to extend in a direction crossing the second side.

20 Claims, 10 Drawing Sheets

(51) Int. Cl.
*G02F 1/1343* (2006.01)
*G02F 1/1362* (2006.01)
*G02F 1/1368* (2006.01)

(56) References Cited

U.S. PATENT DOCUMENTS

| | | |
|---|---|---|
| 7,553,059 B2 | 6/2009 | Kuroda et al. |
| 8,059,229 B2 | 11/2011 | Shinkai et al. |
| 8,068,187 B2 | 11/2011 | Huizinga et al. |
| 2017/0023725 A1* | 1/2017 | Oki .................... G02B 6/0053 |
| 2017/0131455 A1* | 5/2017 | Asano ................. G02B 6/0036 |

* cited by examiner

DISPLAY APPARATUS

This application claims priority to Korean Patent Application No. 10-2016-0047771, filed on Apr. 19, 2016, and all the benefits accruing therefrom under 35 U.S.C. § 119, the content of which in its entirety is herein incorporated by reference.

BACKGROUND

1. Field

Exemplary embodiments of the invention herein relate to a display apparatus, and more particularly, to a display apparatus that reduces light loss and improves light efficiency.

2. Description of Related Art

Generally, a display apparatus includes a display panel displaying an image by using light and a backlight unit generating light to provide the generated light to the display panel. The display panel includes a first substrate on which a plurality of pixels is disposed, a second substrate disposed to face the first substrate, and an image display layer disposed between the first and second substrates.

The image display layer is driven by the plurality of pixels, and adjusts light transmittance of the light provided from the backlight unit to display an image. An image display layer may be a liquid crystal layer, an electrowetting layer, or an electrophoretic layer, for example.

The backlight unit may be classified as an edge-type backlight unit that emits light from a side surface of the display apparatus or as a direct-type backlight unit that emits light from a lower side of the display panel. The edge-type backlight unit includes a light source generating light, a light guide plate guiding the light provided from the light source in an upward direction toward the display panel, and a prism sheet disposed between the guide light plate and the display panel to concentrate the light provided from the light guide plate upwardly, thereby providing the concentrated light to the display panel. A portion of the light emitted from the prism sheet may not be provided to the display panel, but instead leak to the side surface of the display apparatus.

SUMMARY

Exemplary embodiments of the invention provide a display apparatus which reduces light loss and improves light efficiency.

An exemplary embodiment of the invention provides a display apparatus including a display panel, a light guide plate which receives light and guides the received light to the display panel, a light source which extends in a first direction, is adjacent to one side surface of the light guide plate in a second direction crossing the first direction, and generates the light, and a plurality of prism patterns disposed between the display panel and the light guide plate, and each of which has a shape of an inverted triangle in a cross-section, wherein the each prism pattern includes a first pattern, the first pattern including a first side of the inverted triangle facing the display panel, a second side connecting one end of the first side to a vertex of the inverted triangle, which is disposed under the first side, and a third side connecting another end of the first side to the vertex of the inverted triangle, and a second pattern having a refractive index less than that of the first pattern and disposed in a first groove that is defined in the second side to extend in a direction crossing the second side.

In an exemplary embodiment, the prism patterns may extend in the first direction and be arranged in the second direction, and each of the prism patterns may have the inverted triangular shape when viewed in the first direction, and the another end of the first side may be farther from the light source than the one end of the first side.

In an exemplary embodiment, the second pattern may extend in a first diagonal direction between a right direction of the second direction from the one side surface of the light guide plate toward another side surface of the light guide plate, which is opposite to the one side surface of the light guide plate, and an upward direction, which is perpendicular to a top surface of the light guide plate and directed from the light guide plate toward the display panel.

In an exemplary embodiment, the first diagonal direction may be angled at a first angle with to the right direction, and the first diagonal direction may be set to an angle of about 20° to about 80°.

In an exemplary embodiment, the first groove may be defined to be recessed from a predetermined area of the second side toward the inside of the first pattern to extend in the first diagonal direction, and one end of the second pattern in a direction opposite to the first diagonal direction may define the predetermined area of the second side.

In an exemplary embodiment, the display apparatus may further include a third pattern disposed in a second groove defined to be recessed from a predetermined area, which is spaced apart from the first groove, of the second side toward the inside of the first pattern.

In an exemplary embodiment, the second groove and the third pattern may extend in the first diagonal direction, and the second pattern may have a length greater than that of the third pattern in the first diagonal direction and a thickness equal to that of the third pattern in a direction crossing the first diagonal direction.

In an exemplary embodiment, the first diagonal direction may be angled at a first angle with respect to the right direction, the second groove and the third pattern may extend in a second diagonal direction between the right direction and the upward direction, the second diagonal direction may be angled at a second angle with respect to the right direction, and the second angle may be different from the first angle.

In an exemplary embodiment, the second groove and the third pattern may extend in the first diagonal direction, and the second pattern may have a thickness different from that of the third pattern in a direction crossing the first diagonal direction.

In an exemplary embodiment, the first pattern may be set to a refractive index of about 1.5 to about 1.6, and the second pattern may be set to a refractive index of about 1.3 to about 1.4.

In an exemplary embodiment, the first pattern may include an acrylic resin, and the second pattern may include an acrylic resin that is softer than the acrylic resin of the first pattern.

In an exemplary embodiment of the invention, a display apparatus includes a display panel, a light guide plate which receives light and guides the received light to the display panel, a light source extending in a first direction and adjacent to one side surface of the light guide plate in a second direction crossing the first direction, and generating the light, and a plurality of prism patterns disposed between the display panel and the light guide plate, extending in the first direction, arranged in the second direction, and each of which has a shape of an inverted triangle in a cross-section when viewed in the first direction, wherein each of the prism patterns includes a first pattern including a first side of the inverted triangle facing the display panel, a second side connecting one end of the first side to a vertex of the inverted triangle, which is disposed under the first side, and a third side connecting the another end of the first side, which is farther from the light source than the one end of the first side, to the vertex of the inverted triangle, and a second pattern having a refractive index less than that of the first pattern and disposed in a tunnel defined to pass through a predetermined area of the first side from a predetermined area of the second side, wherein the second pattern extends in a first diagonal direction between a right direction of the second direction from the one side surface of the light guide plate toward the other side surface of the light guide plate, which is opposite to the one side surface of the light guide plate, and an upward direction, which is perpendicular to a top surface of the light guide plate and directed from the light guide plate toward the display panel.

In an exemplary embodiment of the invention, a display apparatus includes a display panel, a light guide plate which receives light and guides the received light to the display panel, a light source which extends in a first direction, is adjacent to one side surface of the light guide plate in a second direction crossing the first direction, and generates the light, and a plurality of prism patterns disposed between the display panel and the light guide plate, extending in the first direction, arranged in the second direction, and each of which has a shape of an inverted triangle in a cross-section when viewed in the first direction, wherein each of the prism patterns includes a first pattern including a first side of the inverted triangle facing the display panel, a second side connecting one end of the first side to a vertex of the inverted triangle, which is disposed under the first side, and a third side connecting the another end of the first side, which is farther from the light source than the one end of the first side, to the vertex of the inverted triangle, and a first groove defined to be recessed from a predetermined area of the second side toward the inside of the first pattern to extended in a first diagonal direction between a right direction of the second direction from one side surface of the light guide plate toward another side surface of the light guide plate, which is opposite to the one side surface of the light guide plate, and an upward direction, which is perpendicular to a top surface of the light guide plate and directed from the light guide plate toward the display panel.

BRIEF DESCRIPTION

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
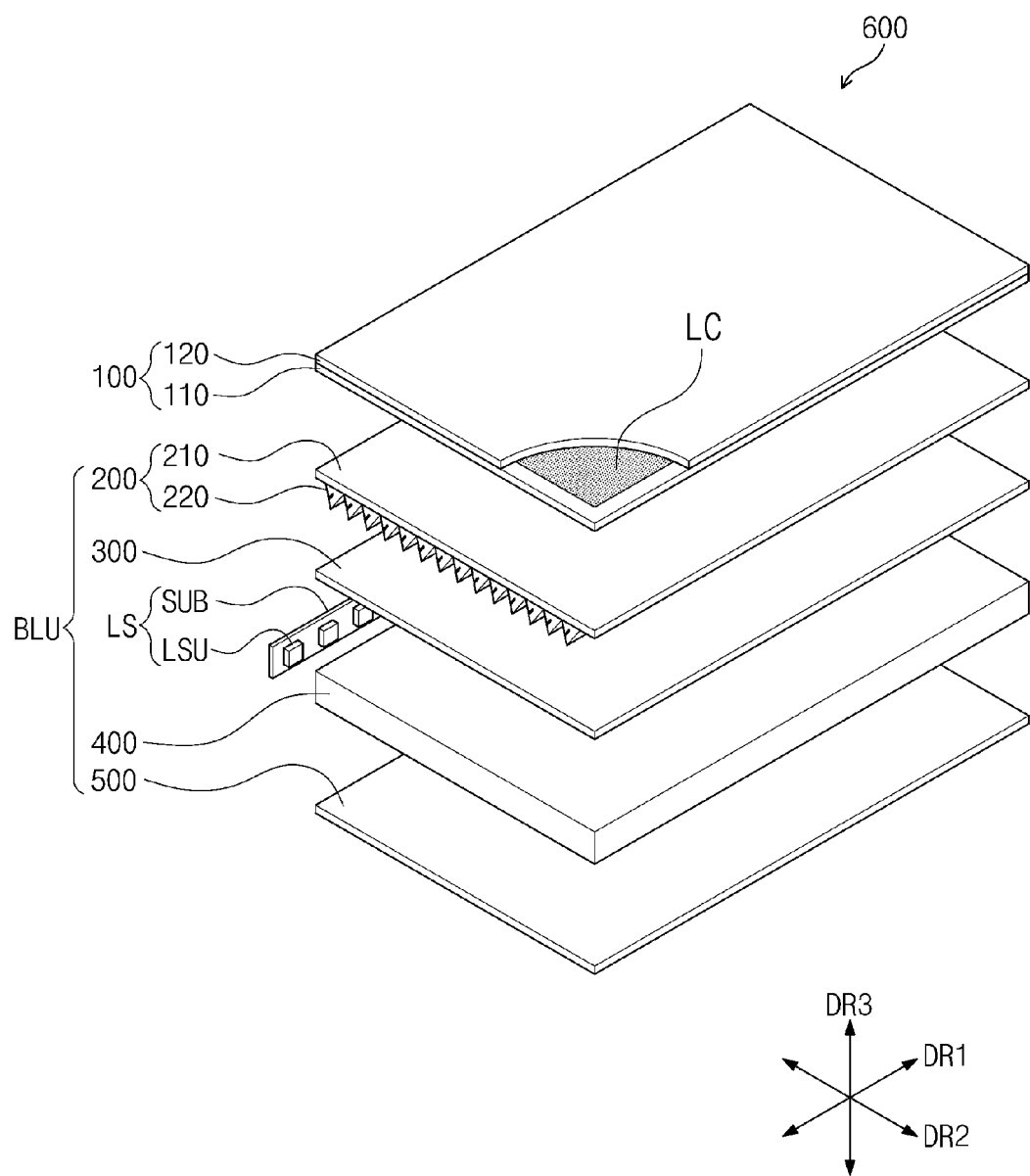
FIG. 1 is an exploded perspective view of an exemplary embodiment of a display apparatus according to the invention.

The invention and methods of accomplishing the same may be understood more readily by reference to the following detailed description of exemplary embodiments and the accompanying drawings. However, the invention may be embodied in many different forms, and should not be construed as being limited to the exemplary embodiments set forth herein. Rather, these exemplary embodiments are provided so that this disclosure will be thorough and complete, and will fully convey the scope of the invention to those skilled in the art, the invention will be defined solely by the scope of appended claims. Like numbers refer to like elements throughout.

It will be understood that when an element or layer is referred to as being "on" another element or layer, it can be directly on the other element or layer or intervening elements or layers may be present. In contrast, when an element is referred to as being "directly on" another element or layer, there are no intervening elements or layers present. The term "and/or" includes any and all combinations of one or more of the associated listed items.

Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the element in use or operation in addition to the orientation depicted in the figures. Like numbers refer to like elements throughout.

It will be understood that, although the terms "first", "second", etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

The exemplary embodiments in the detailed description will be described with a top plan view and sectional views as ideal schematic views of the invention. Accordingly, shapes of the exemplary views may be modified according to manufacturing techniques and/or allowable errors. Therefore, the exemplary embodiments of the invention are not limited to the specific shape illustrated in the exemplary views, but may include other shapes that may be created according to manufacturing processes. Thus, areas exemplified in the drawings have general properties, and shapes of the areas exemplified in the drawings are to illustrate a specific shape of a region of an element, not to be construed as limited to the scope of the present disclosure.

Hereinafter, exemplary embodiments of the invention will be described in detail with reference to the accompanying drawings.

FIG. 1 is an exploded perspective view according to an exemplary embodiment of the invention.

Referring to FIG. 1, a display apparatus 600 according to an exemplary embodiment of the invention includes a display panel 100 displaying an image by using light and a backlight unit BLU generating light to provide the generated light to the display panel 100.

The display panel 100 has a long side in a first direction DR1 and a short side in a second direction DR2 crossing the direction DR1. The backlight unit BLU is disposed at a rear side of the display panel 100 to provide the light to the display panel 100.

Although not shown in FIG. 1, the display panel 100 includes a plurality of pixels displaying an image by using light. Each of the pixels may display one of primary colors. In an exemplary embodiment, the primary colors may include red, green, and blue colors, for example, but the invention is not limited thereto. In another exemplary embodiment, the primary colors may further include various other colors such as white, yellow, cyan, and magenta.

In an exemplary embodiment, the display panel 100 may be a liquid crystal display panel including a liquid crystal layer LC, for example. In an exemplary embodiment, the display panel 100 may include a first substrate 110 on which the plurality of pixels are disposed, a second substrate 120 facing the first substrate, and the liquid crystal layer LC disposed between the first substrate 110 and the second substrate 120, for example. However, the invention is not limited thereto. In another exemplary embodiment, the display panel 100 may be an electrophoretic display panel including an electrophoretic layer or an electrowetting display panel including an electrowetting layer, for example.

In an exemplary embodiment, the backlight unit BLU may be an edge-type backlight unit, for example. The backlight unit BLU includes a prism sheet 200, a diffusion sheet 300, a light guide plate 400, a light source LS, and a reflection sheet 500. Each of the prism sheet 200, the diffusion sheet 300, the light guide plate 400, the light source LS, and the reflection sheet 500 has a long side in the first direction DR1 and a short side in the second direction DR2.

Hereinafter, a third direction DR3 is defined as a direction perpendicular to a plane that is parallel to the first direction DR1 and the second direction DR2. In addition, each of the first direction DR1, the second direction DR2 and the third direction DR3 is defined in both directions.

The prism sheet 200 is disposed below the display panel 100, and the diffusion sheet 300 is disposed below the prism sheet 200. The light guide plate 400 is disposed below the diffusion sheet 300, and the reflection sheet 500 is disposed below the light guide plate 400. The light source LS extends in the first direction DR1 and may be adjacent to one side surface of the light guide plate 400 in the second direction DR2.

In the second direction DR2, one side surface of the light guide plate 400 may be defined as a light incident surface, and the other side surface of the light guide plate 400, which is opposite to the one side surface of the light guide plate 400, may be defined as an opposite surface. Light generated in the light source LS is provided to the one side surface of the light guide plate 400, and the light guide plate 400 directs the light provided from the light source LS in an upward direction toward the display panel 100.

The light source LS includes a light source substrate SUB extending in the first direction DR1 and a plurality of light source units LSU disposed (e.g., mounted) on the light source substrate SUB. The light source units LSU are disposed on an entire surface of the light source substrate SUB facing the one side surface of the light guide plate 400 in the second direction DR2. The light source units LSU are disposed at a uniform distance in the first direction DR1 to face the one side surface of the light guide plate 400.

The light source units LSU generate light, and the light generated in the light source units LSU is provided to the one side surface of the light guide plate 400. The light guide plate 400 guides the light provided from the light source units LSU to the display panel 100.

The reflection sheet 500 reflects the light emitted downward from the light guide plate 400 in the upward direction to the display panel 100. The diffusion sheet 300 may diffuse the light provided from the light guide plate 400.

The prism sheet 200 may concentrate the light provided from the diffusion sheet 300 in an upward direction crossing the plane that is parallel to the first direction DR1 and the second direction DR2. The light passing through the prism sheet 200 may travel upwardly to the display panel 100 and then be provided to the display panel 100 having uniform brightness distribution.

The prism sheet 200 includes a transparent substrate 210 and a plurality of prism patterns 220 disposed on a bottom surface of the transparent substrate 210. In an exemplary embodiment, each of the prism patterns 220 may have an inverted triangular shape in a cross-section when viewed in the first direction DR1, for example. The prism patterns 220 extend in the first direction DR1 and are arranged in the second direction DR2.

The prism patterns 220 may concentrate the light provided from the diffusion sheet 300 upwardly to the display panel 100. Detailed configuration of the prism patterns 220 will be described below in detail with reference to FIG. 4.

In an exemplary embodiment, the light generated in the backlight unit BLU may be blue light, for example. In the exemplary embodiment, the light source units LSU of the backlight unit BLU may be blue light emitting diodes ("LEDs") generating the blue light, for example. The second substrate 120 of the display panel 100 includes a plurality of light conversion layers that convert the blue light into red light or green light or transmit the blue light without converting, for example. This will be described below in detail with reference to FIG. 3.

Figure 2:
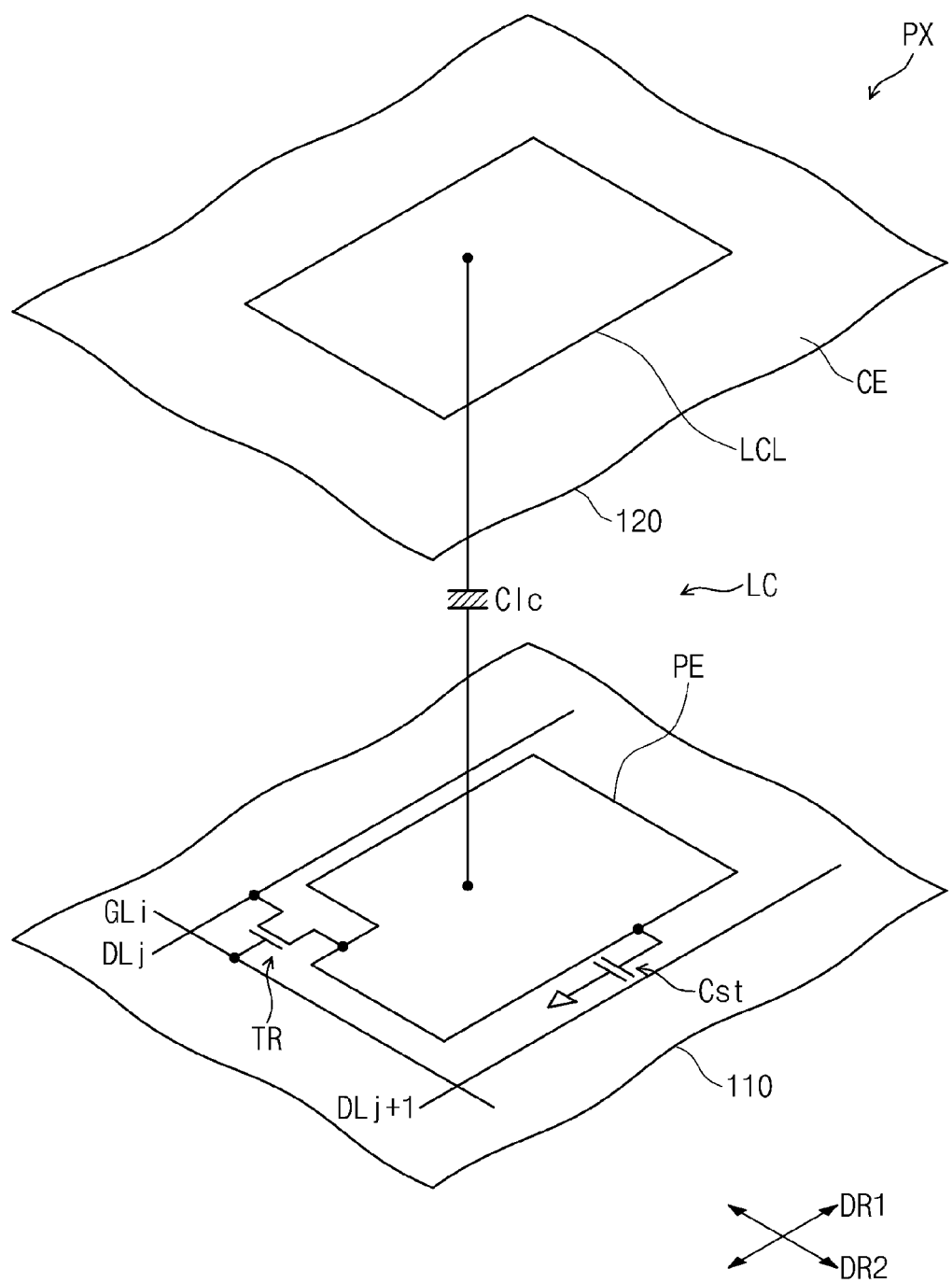
FIG. 2 is a view illustrating a configuration of a pixel of FIG. 1.

FIG. 2 is a view illustrating a configuration of a pixel illustrated in FIG. 1.

For convenience of description, a pixel PX that is connected to a gate line GLi and a data line DLj is illustrated in FIG. 2. Although not illustrated, each of other pixels PX of the display panel 100 may have the same configuration as that of the pixel PX illustrated in FIG. 2.

Referring to FIG. 2, the pixel PX includes a transistor TR connected to the gate line GLi and the data line DLj, a liquid crystal capacitor Clc connected to the transistor TR, and a storage capacitor Cst connected in parallel to the liquid crystal capacitor Clc. In another exemplary embodiment, the storage capacitor Cst may be omitted. Here, reference symbols i and j are natural numbers.

The transistor TR may be disposed on the first substrate 110. The transistor TR includes a gate electrode connected to the gate line GLi, a source electrode connected to the date line DLi, and a drain electrode connected to the liquid crystal capacitor Clc and the storage capacitor Cst.

The liquid crystal capacitor Clc includes a pixel electrode PE disposed on the first substrate 110 and between adjacent data lines DLj and DLj+1, a common electrode CE disposed on the second substrate 120, and the liquid crystal layer LC disposed between the pixel electrode PE and the common electrode CE. The liquid crystal layer LC acts as a dielectric. The pixel electrode PE is connected to the drain electrode of the transistor TR.

Although the pixel electrode PE has a non-slit structure in the illustrated exemplary embodiment of FIG. 2, the invention is not limited thereto. In another exemplary embodiment, the pixel electrode PE may have a slit structure that includes a cross-shaped stem part and a plurality of branch parts extending from the stem part in a radial direction, for example.

The common electrode CE may be disposed over the second substrate 120. However, the invention is not limited thereto. In an exemplary embodiment, the common electrode CE may be disposed on the first substrate 110. In this case, the slit may be defined in at least one of the pixel electrode PE and the common electrode CE, for example.

The storage capacitor Cst may include the pixel electrode PE, a storage electrode (not shown) branched from a storage line (not shown), and an insulating layer disposed between the pixel electrode PE and the storage electrode. The storage line is disposed on the first substrate 110. The storage line together with the at least one gate lines may be provided at the same time on the same layer. The storage electrode may partially overlap the pixel electrode PE.

The pixel electrode PE further includes a light conversion layer LCL disposed on the second substrate 120. The light conversion layer LCL may convert the light provided from the backlight unit BLU into light having a predetermined color or transmit the light without converting. In an exemplary embodiment, when the light generated in the backlight unit BLU is blue light, the light conversion layer LCL may convert the blue light provided from the backlight unit BLU into red light or green light or transmit the blue light without converting, for example.

The transistor TR is turned on in response to a gate signal received through the gate line GLi. A data voltage received through the data line DLj is provided to the pixel electrode PE of the liquid crystal capacitor Clc via the turned-on transistor TR. A common voltage is applied to the common electrode CE.

Electric fields are generated between the pixel electrode PE and the common electrode CE due to a difference in voltage level of the data voltage and the common voltage. Liquid crystal molecules are driven by the electric fields generated between the pixel electrode PE and the common electrode CE. Light transmittance may be adjusted by the liquid crystal molecules driven by the electric fields to display an image.

In an exemplary embodiment, a storage voltage having a constant voltage level may be applied to the storage line. However, the invention is not limited thereto. In another exemplary embodiment, the common voltage may be applied to the storage line, for example. The storage capacitor Cst may supplement a voltage charged to the liquid crystal capacitor Clc.

Figure 3:
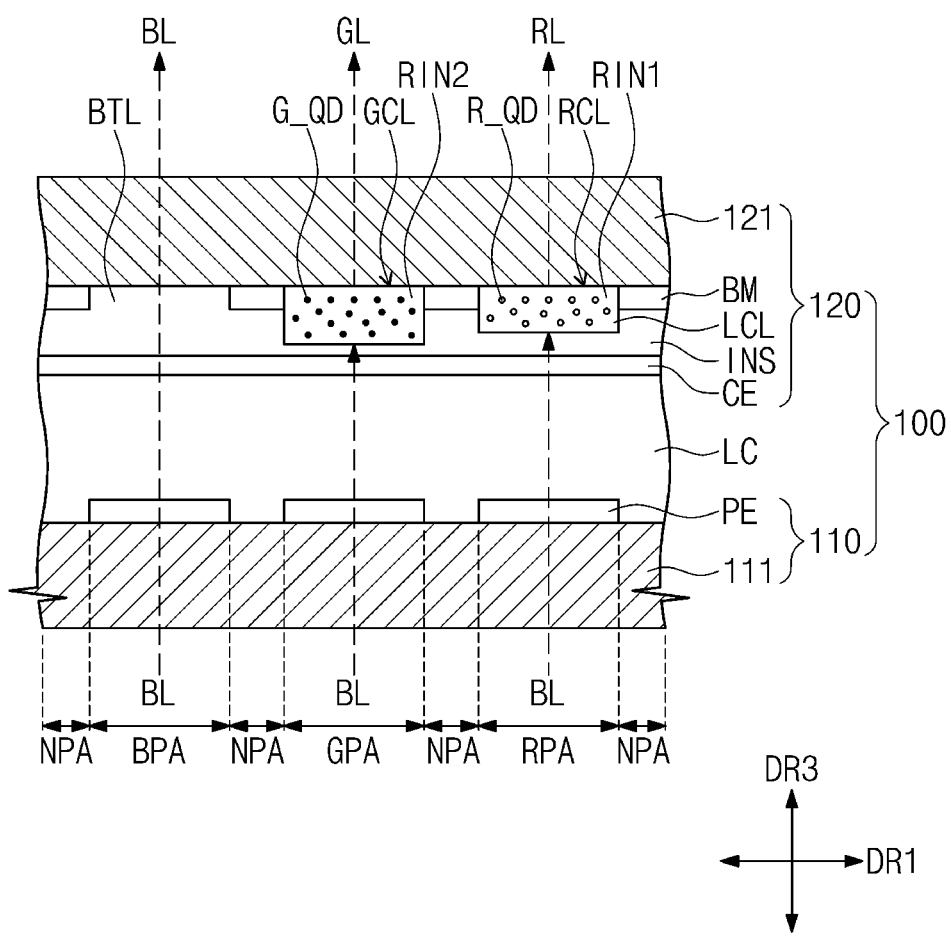
FIG. 3 is a cross-sectional view illustrating a predetermined area of a display panel of FIG. 1.

FIG. 3 is a cross-sectional view illustrating a predetermined area of the display panel illustrated in FIG. 1. Although cross-sections of three pixels that display light having colors different from each other are illustrated in FIG. 3, for convenience of description, the transistor TR is omitted, and the pixel electrodes PE are illustrated.

Referring to FIG. 3, a planar area on the first substrate 110 and a planar area on the second substrate 120 of the display panel 100 include a plurality of pixel areas BPA, GPA, and RPA corresponding to the pixels PX and non-pixel areas NPA between the pixel areas BPA, GPA, and RPA.

In an exemplary embodiment, the pixel areas BPA, GPA, and RPA include a red pixel area RPA displaying a red color, a green pixel area GPA displaying a green color, and a blue pixel area BPA displaying a blue color, for example. Although three pixel areas BPA, GPA, and RPA are illustrated in FIG. 3 for convenience of description, the pixel areas BPA, GPA, and RPA substantially include a plurality of red pixel areas RPA, a plurality of green pixel areas GPA, and a plurality of blue pixel areas BPA.

The first substrate 110 includes the first base substrate 111 and a plurality of pixel electrodes PE disposed on the first base substrate 111. In an exemplary embodiment, the first base substrate 111 may be a glass substrate or a plastic substrate, for example, each of which has a light transmitting property. The pixel electrodes PE are disposed on the pixel areas BPA, GPA, and RPA.

The second substrate 120 includes a second base substrate 121 and a plurality of the light conversion layers LCL, a black matrix BM, an insulating layer INS, and the common electrode CE, which are disposed under the second base substrate 121. In an exemplary embodiment, the second base substrate 121 may be a glass or plastic substrate having a light transmitting property, for example. When each of the first substrate 111 and the second substrate 121 is the plastic substrate having flexibility, the display panel 100 may be a flexible display panel.

The light conversion layers LCL are disposed on the pixel areas BPA, GPA, and RPA of a bottom surface of the second base substrate 121. The black matrix BM is disposed on the non-pixel areas NPA of the lower portion of the second base substrate 121.

The insulating layer INS is disposed on lower portions of light conversion layers LCL and the black matrix BM. The insulating layer INS may have a flat bottom surface to planarize the lower portions of the light conversion layers LCL and the black matrix BM. The insulating layer INS may be defined as a planarization film.

The common electrode CE is disposed on the bottom surface of the insulating layer INS. The common electrode CE is disposed to face the pixel electrodes PE. As described above, the liquid crystal molecules may be driven by the electric fields generated between the pixel electrodes PE and the common electrode CE. The liquid crystal layer LC is driven, and the light BL generated in the backlight unit BLU is provided to the light conversion layers LCL through the liquid crystal layer LC.

The light conversion layers LCL include the first light conversion layer RCL, the second light conversion layer GCL, and a light transmission layer BTL, which are sequentially arranged. However, the invention is not limited thereto. In another exemplary embodiment, the first light conversion layer RCL, the second light conversion layer GCL, and a light transmission layer BTL may be arranged in varied orders, for example.

Although three light conversion layers LCL are illustrated in FIG. 3 for convenience of description, the light conversion layers LCL substantially include a plurality of the first light conversion layers RCL, a plurality of the second light conversion layers GCL, and a plurality of a light transmission layers BTL.

The first light conversion layer RCL is disposed on the red pixel area RPA, and the second light conversion layer GCL is disposed on the green pixel area GPA. The light transmission layer BTL is disposed on the blue pixel area BPA.

The second light conversion layer GCL may have a thickness greater than that of the first light conversion layer RCL in the third direction DR3. The black matrix BM may have a thickness less than that of the second light conversion layer GCL. The black matrix BM may have a thickness less than or equal to that of the first light conversion layer RCL. In an exemplary embodiment, a structure in which the black matrix BM has a thickness less than that of the first light conversion layer RCL is illustrated in FIG. 3.

The thickness of the black matrix BM may be substantially defined as the thickness of the insulating layer INS. The light transmission layer BTL may have a thickness greater than that of the second light conversion layer GCL. Therefore, the light conversion layers LCL may have thicknesses different from each other.

The first light conversion layer RCL converts the light BL provided from the backlight unit BLU into light having a first color RL to output the converted light. The second light conversion layer GCL converts the light BL provided from the backlight unit BLU into light having a second color GL to output the converted light. In an exemplary embodiment, the first color may be a red color, and the second color may be a green color, for example. In an exemplary embodiment, the light BL generated in the backlight unit BLU has a third color, and the third color may be a blue color, for example.

The light transmission layers BTL are defined as an area of the insulating layer INS corresponding to the pixel areas PA, on which the first and second light conversion layers RCL and GCL are not disposed. The light transmission layers BTL transmit the blue light BL provided from the backlight unit BLU. Accordingly, light RL, GL, and BL having red, green, and blue colors may be outputted to display a predetermined image.

The first light conversion layer RCL includes a first resin RIN1 and a plurality of first quantum dots R_QD accommodated in the first resin RIN1 to absorb light having a blue wavelength band, thereby emitting light having a red wavelength band. The second light conversion layer GCL includes a second resin RIN2 and a plurality of second quantum dots G_QD accommodated in the second resin RIN2 to absorb the light having the blue wavelength band, thereby emitting light having a green wavelength band.

The quantum dots that absorb the light having the blue wavelength band BL to emit the light having the green wavelength band GL may have light conversion efficiency less than that of the quantum dots that absorb the light having the blue wavelength band BL to emit the light having the red wavelength band RL.

Since the second light conversion layer GCL has the thickness greater than that of the first light conversion layer RCL in the third direction DR3, a larger amount of second quantum dots G_QD may be provided in the second light conversion layer GCL. As a result, the second light conversion layer GCL may be improved in efficiency.

Figure 4:
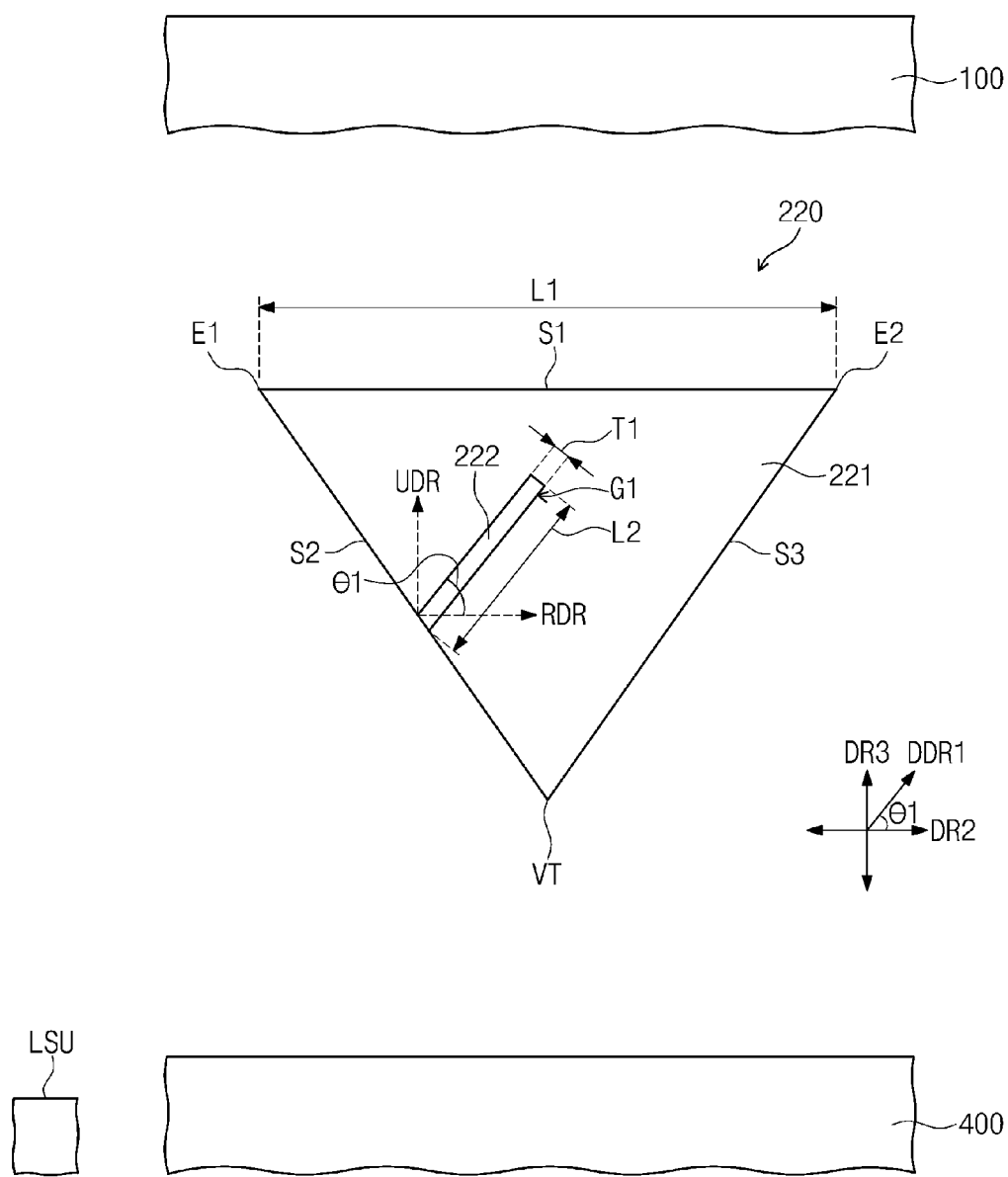
FIG. 4 is a view illustrating a side surface of one prism pattern of FIG. 1.

FIG. 4 is a view illustrating a side surface of one prism pattern of FIG. 1.

For convenience of description, although one prism pattern is illustrated in FIG. 4, each of other prism patterns 220 may have the same configuration as that of the prism pattern 220 of FIG. 4. In addition, a side surface of a predetermined area of the display panel 100 disposed above a prism pattern 220, a side surface of a predetermined area of the light guide plate 400 disposed under a prism pattern 220, and a side surface of a predetermined area of the light source unit LSU are illustrated together with the prism pattern 220.

Referring to FIG. 4, the prism pattern 220 includes a first pattern 221 including a first side S1, a second side S2, and a third side S3 and a second pattern 222 disposed in a first groove G1 defined in the second side S2.

The first side S1 of the prism pattern 220 having an inverted triangular shape is disposed to face the display panel 100 disposed above the prism pattern 200. The second side S2 of the prism pattern 220 having an inverted triangular shape connects one end E1 of the first side S1 to a vertex VT of the prism pattern 220 having an inverted triangular shape, which is disposed under the first side S1 in the third direction DR3 to face the light guide plate 400.

The third side S3 of the prism pattern 220 having an inverted triangular shape connects the other end E2 of the first side S1, which is opposite to the one end E1 of the first side S1 in the second direction DR2, to the vertex VT in a diagonal direction between the second direction DR2 and the third direction DR3. The other end E2 of the first side S1 is farther from the light source LS (refer to FIG. 1) including the light source unit LSU than the one end E1 of the first side S1.

Hereinafter, a direction from one side surface of the light guide plate 400 facing the light source unit LSU toward the other side surface of the light guide plate 400 in the second direction DR is defined as a right direction RDR. A direction that is perpendicular to a top surface of the light guide plate 400 and directed from the light guide plate 400 toward the display panel 100 in the third direction DR3 is defined as an upward direction UDR.

The second pattern 222 extends in a first diagonal direction DDR1 between the right direction RDR and the upward direction UDR. The first diagonal direction DDR1 may be defined as a direction that is directed from a crossing point of the right direction RDR and the upward direction UDR toward a space between the right direction RDR and the upward direction UDR on a plane parallel to the second direction DR2 and the third direction DR3.

The first diagonal direction DDR1 is a direction crossing the second side S2. The first diagonal direction DDR1 extends at a first angle θ1 less than a right angle defined by the right direction RDR and the upward direction UDR with reference to the right direction RDR. The second pattern 222 extends in the first diagonal direction DDR1 that is angled at the first angle θ1 with reference to the right direction RDR.

The first groove G1 is defined to be recessed from a predetermined area of the second side S2 toward the inside of the first pattern 221. The first groove G1 extends in the first diagonal direction DDR1 angled at the first angle θ1 with reference to the right direction RDR. The second pattern 222 is disposed inside the first groove G1. The second pattern 222 has one end that defines a predetermined area of the second side S2 in an opposite direction of the first diagonal direction DDR1.

In an exemplary embodiment, the first angle θ1 may be set to an angle of about 20° to about 80°, for example. In an exemplary embodiment, a first length L1 of the first side S1 may be set to a length of about 18 micrometers (μm), for example. In an exemplary embodiment, the inverted triangular shape may be a regular triangle, for example. In this case, each of a length from the one end E1 of the first side S1 to the vertex VT of the inverted triangle and a length from the other end E2 of the first side S1 to the vertex VT of the inverted triangle may be the same as that of the first side S1.

In an exemplary embodiment, the second pattern 222 may have a second length L2 equal to or greater than about 1 μm in the first diagonal direction DDR1, for example. In an exemplary embodiment, the second pattern 222 may have a first thickness T1 equal to or greater than about 0.5 μm in a direction perpendicularly crossing the first diagonal direction DDR1, for example.

The second pattern 222 may have a refractive index less than that of the first pattern 221. In an exemplary embodiment, the refractive index of the first pattern 221 may be set to about 1.5 to about 1.6, and the refractive index of the second pattern 222 may be set to about 1.3 to about 1.4, for example.

In an exemplary embodiment, each of the first pattern 221 and the second pattern 222 may include an acrylic resin, for example. In an exemplary embodiment, the second pattern 222 may include an acrylic resin softer than an acrylic resin of the first pattern 221 to have a refractive index less than that of the first pattern 221, for example.

Figure 5:
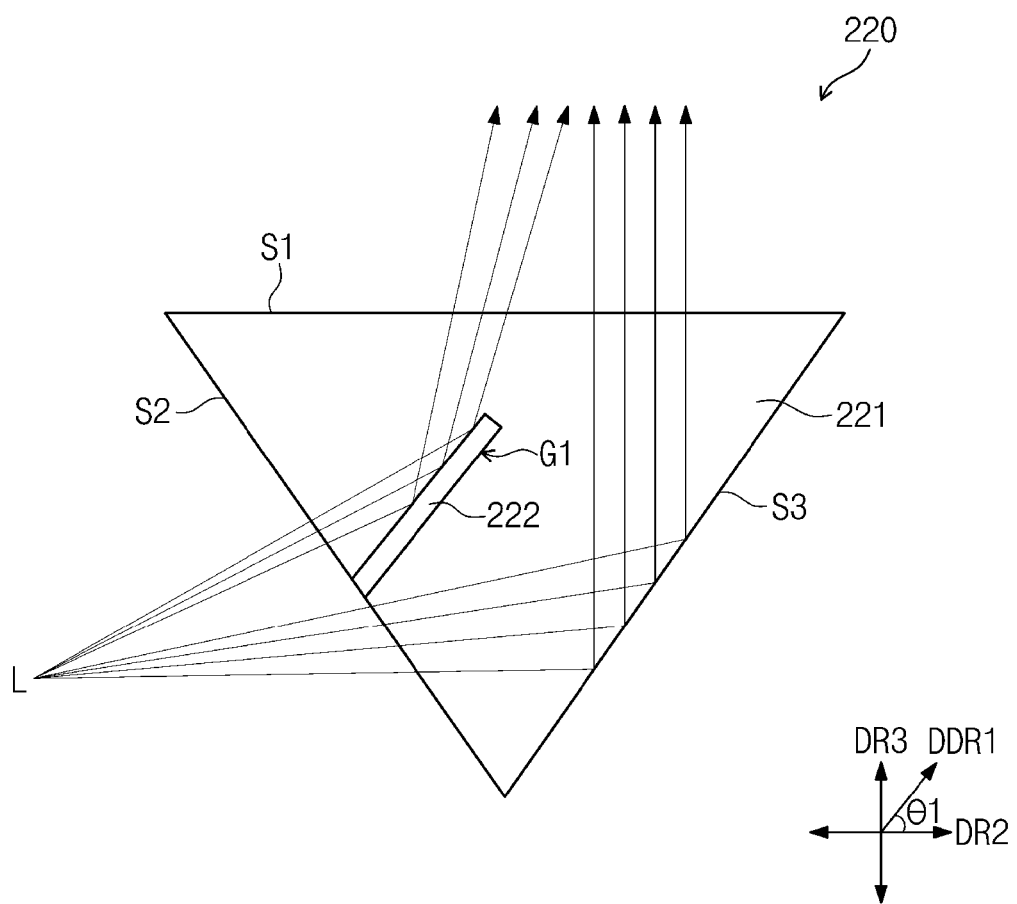
FIG. 5 is a view illustrating an example, in which light is refracted by the prism pattern of FIG. 4.
Figure 6:
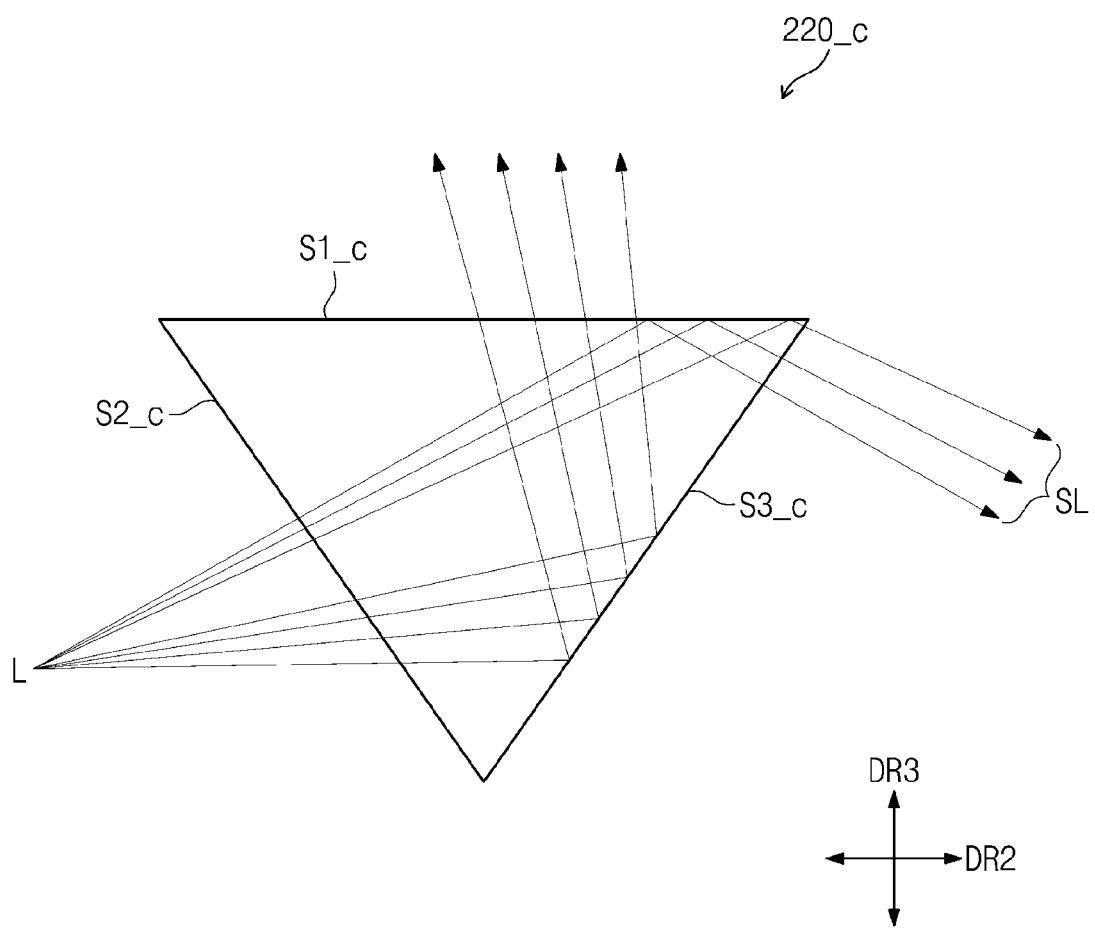
FIG. 6 is a view illustrating an example, in which light is refracted by a comparative prism pattern.

FIG. 5 illustrates an example in which light is refracted in the prism pattern of FIG. 4. FIG. 6 illustrates an example in which light is refracted in a comparative prism pattern.

Referring to FIG. 5, the light L traveling to the second side S2 of the first pattern 221 may pass through the second side S2 to travel into the first pattern 221. According to Snell's law, the total reflection is defined as a phenomenon in which, when light travels from a material having a high refractive index to a material having a low refractive index, and incident light has an angle greater than the critical angle, the light is totally reflected by an interface between two materials with different refractive indexes from each other.

In the light passing through the second side S2 of the first pattern 221 to travel to the inside of the first pattern 221, light provided to the third side S3 of the first pattern 221 is totally reflected by the third side S3 to travel upwardly to the display panel 100 (refer to FIG. 4).

The first pattern 221 has a refractive index greater than that of the second pattern 222. Therefore, in the light passing through the second side S2 of the first pattern 221 to travel to the inside of the first pattern 221, light travelling to the second pattern 222 may be totally reflected by an interface between the second pattern 222 and the first pattern 221 to pass through the first side S1 and travel upwardly to the display panel 100.

If the second pattern 222 extends in the third direction DR3 or the second direction DR2, the light travelling to the second pattern 222 may be totally reflected by the interface between the second pattern 222 and the first pattern 221 and may not travel upwardly to the display panel 100.

As described in an exemplary embodiment of the invention, however, when the second pattern 222 extends in the first diagonal direction DDR1, the light travelling to the second pattern 222 may be totally reflected by the interface between the second pattern 222 and the first pattern 221 to change in traveling direction and travel upwardly to the display panel 100.

Referring to FIG. 6, a comparative prism pattern 220_c has a shape of an inverted triangle like the prism pattern 220, but does not include the second pattern 222 and thus the first groove G1 is not defined therein.

The comparative prism pattern 220_c includes a first side S1_c facing the display panel, a second side S2_c connecting one end of the first side S1_c to a vertex of the inverted triangle, which is disposed under the first side S1_c, in the second direction DR2, and a third side S3_c connecting the other end of the first side S1_c to the vertex of the inverted triangle, which is disposed under the first side S1_c, in the second direction.

Light L travelling to the second side S2_c of the comparative prism pattern 220_c may pass through the second side S2_c to travel to the inside of the comparative prism pattern 220_c. In the light passing through the second side S2_c of the comparative prism pattern 220_c, light provided to the third side S3_c of the comparative prism pattern 220_c may be totally reflected by the third side S3_c to travel upwardly to the display panel 100.

However, in the light passing through the second side S2_c of the comparative prism pattern 220_c, light provided to the first side S1_c of the comparative prism pattern 220_c may be totally reflected by the first side S1_c to travel to the third side S3_c and then pass through the third side S3_c to leak. That is, in the light passing through the second side S2_c, the light provided to the first side S1_c may not be provided to the display panel 100, but leak. Such light may be defined as side leakage light SL or side lobe SL.

However, in an exemplary embodiment of the invention, the second pattern 222 of the prism pattern 220 is disposed in the first groove G1 of the first pattern 221 to extend in the first diagonal direction DDR1. The light passing through the second side S2 to travel to the third side S3 may be totally reflected by the interface between the second pattern 222 and the first pattern 221 to travel upwardly to the display panel 100, thereby reducing light loss. In addition, since an amount of light provided to the display panel 100 may increase to improve the light efficiency.

As a result, the display apparatus 600 according to an exemplary embodiment of the invention may reduce the light loss to improve the light efficiency.

Figure 7:
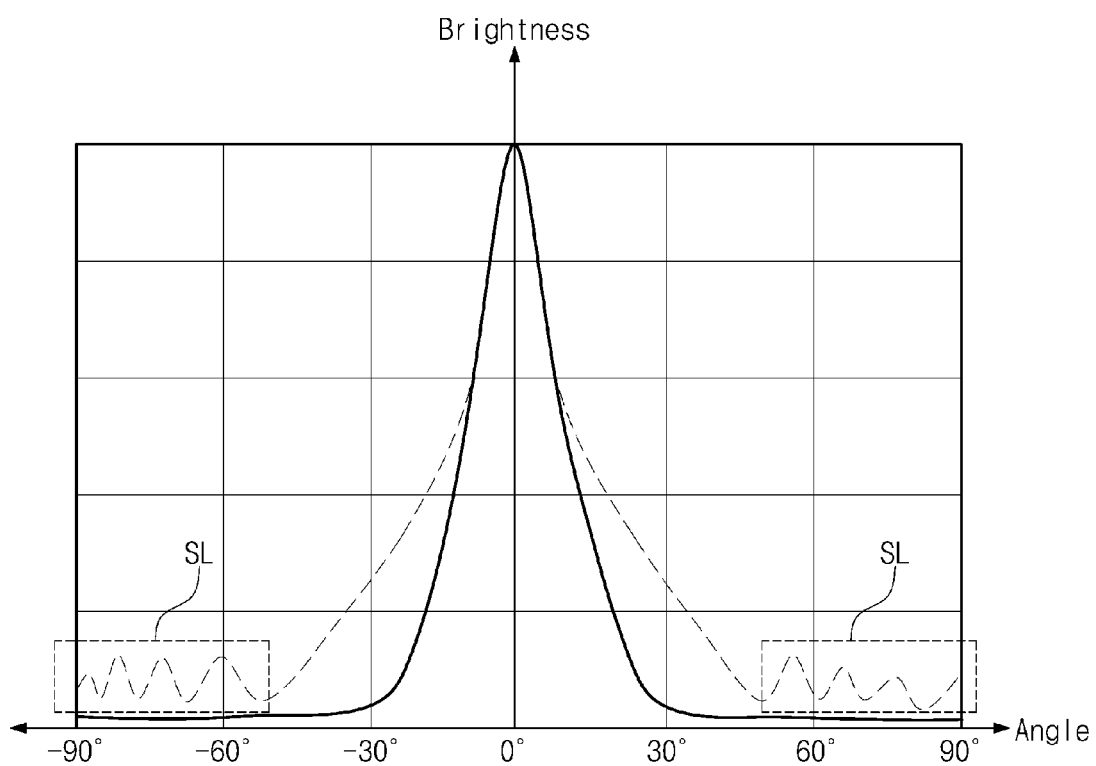
FIG. 7 is a graph illustrating the brightness of light according to a viewing angle of an observer.

FIG. 7 is a graph illustrating brightness of light according to an observer's viewing angle.

Referring to FIG. 7, a viewing angle of about 0° indicates brightness of light in a case in which the observer sees a plane parallel to the first direction DR1 and the second direction DR2 in a direction perpendicular to the plane parallel to the first direction DR1 and the second direction DR2. In an exemplary embodiment, a viewing angle of 0° indicates brightness of light in a case in which the observer sees a predetermined area of the backlight unit BLU in a direction perpendicular to the plane of the backlight unit BLU, for example.

Viewing angles of 30° and 60° indicate brightness of light in a case in which the observer sees the plane of the backlight unit BLU in directions that are angled at 30° and 60° with respect to the direction perpendicular to the plane of the backlight unit BLU, respectively. A viewing angle of 90° indicates brightness of light in a case in which the observer sees the backlight unit BLU in a direction angled at about 90° with respect to the direction perpendicular to the plane of the backlight unit BLU.

A solid line indicates brightness of light according to the viewing angles when the prism pattern 220 in FIG. 4 is used. A dotted line indicates brightness of light according to the viewing angles when the comparative prism pattern 220_c in FIG. 6 is used.

As shown in the graph illustrated as the dotted line, when the comparative prism pattern 220_c is used, the brightness of the side lobe SL is measured at a viewing angle of about 50° to about 90°. That is, the light is emitted at an angle of about 50° to about 90° to leak to the side surface of the display apparatus 600 (refer to FIG. 1).

However, as shown in the graph illustrated as the solid line, when the prism pattern 220 according to the invention is used, the brightness of the light is not measured at an angle that is equal to or greater than that of about 35°. Therefore, light may be emitted at an angle that is greater than or equal to that of about 35° to reduce the light loss and be emitted at an angle less than that of about 35° to improve the light efficiency.

FIGS. 8 to 13 are views illustrating configurations of the prism patterns in display apparatuses according to various exemplary embodiments of the invention.

Different points between prism patterns 220_1 to 220_6 of FIGS. 8 to 13 and the prism pattern 220 of FIG. 4 will be mainly described because only the prism patterns of FIG. 1 is changed in configuration.

Figure 8:
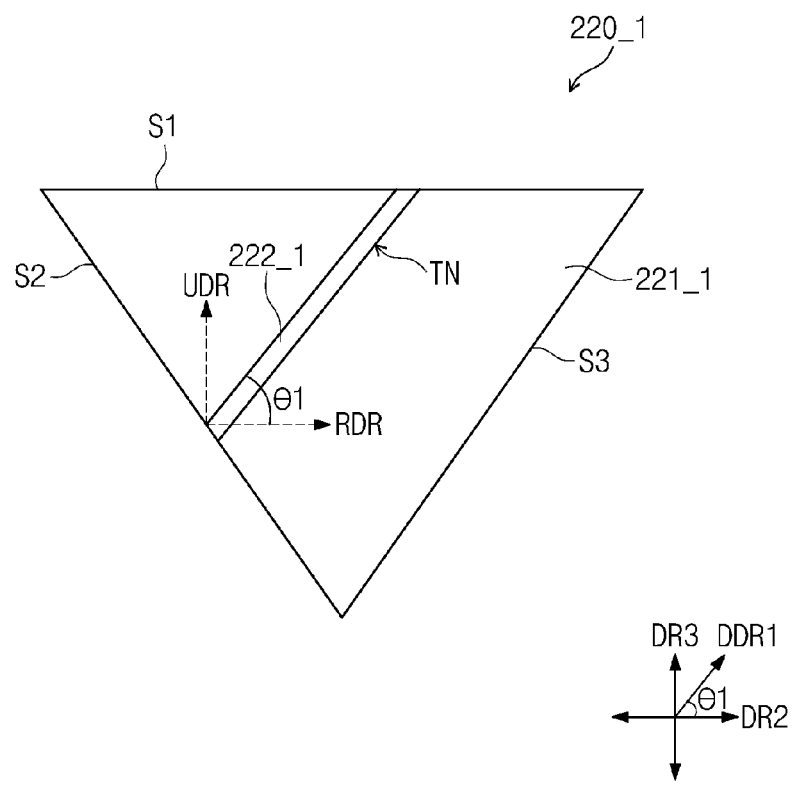
FIGS. 8 to 13 are views illustrating various exemplary embodiments of prism patterns of the display apparatus according to the invention.

Also, an inverted triangular shape of each of the prism patterns 220_1 to 220_6 of FIGS. 8 to 13 is the same as that of the prism pattern 220 of FIG. 4. Therefore, the first side S1, the second side S2, and the third side S3 in the first pattern 221_1 of FIG. 8 is substantially the same configuration as those of the first side S1, the second side S2, and the third side S3 in the first pattern 221 of FIG. 4. Hereinafter, the description on the connection configuration of the first side S1, the second side S2, and the third side S3 of FIGS. 3 to 13 will be omitted.

Referring to FIG. 8, the prism pattern 220_1 includes a first pattern 221_1 and a second pattern 222_1 disposed in a tunnel TN defined to pass through a predetermined area of the first side S1 of the first pattern 221_1 from a predetermined area of the second side S2 of the first pattern 221_1.

The tunnel TN and the second pattern 222_1 extend in the first diagonal direction DDR1 angled at the first angle θ1 with respect to the right direction RDR. The second pattern 222_1 has one end that defines a predetermined area of the second side S2 in a direction opposite to the first diagonal direction DDR1 and the other end that defines a predetermined area of the first side S1 in the first diagonal direction DDR1.

The second pattern 222_1 has a refractive index less than that of the first pattern 221_1. Since light passing through the second side S2 to travels to the third side S3 may be totally reflected by the interface between the second pattern 222_1 and the first pattern 221_1 to travel upwardly to the display panel 100, thereby reducing the light loss and improving the light efficiency.

Figure 9:
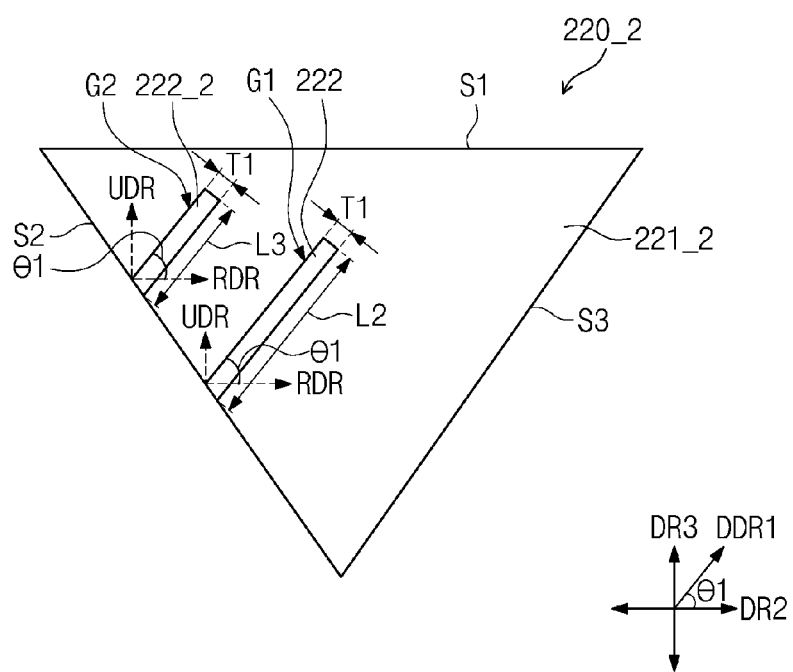

Referring to FIG. 9, the prism pattern 220_2 includes a first pattern 221_2, a second pattern 222 disposed in the first groove G1 defined in the second side S2 of the first pattern 221_2, and a third pattern 222_2 disposed in the second groove G2 defined in the second side S2 of the first pattern 221_2.

The first groove G1 and the second pattern 222 have substantially the same configuration as those of the first groove G1 and the second pattern 222 of FIG. 4, respectively. The second groove G2 may be defined to be recessed to the inside of the first pattern 221_2 from a predetermined area of the second side S2, which is spaced apart from the first groove G1.

The first groove G1 and the second groove G2 are spaced apart from each other and extend in parallel to each other, and the second pattern 222 and the third pattern 222_2 are spaced apart from each other and extend in parallel to each other. Therefore, the second groove G2 and the third pattern 222_2 extend in the first diagonal direction DDR1 that is angled at the first angle θ1 with respect to the right direction RDR.

The second pattern 222 and the third pattern 222_2 may be set to have lengths different from each other in the first diagonal direction DDR1. In an exemplary embodiment, the second pattern 222 may have a second length L2 that is greater than a third length L3 of the third pattern 222_2. However, the invention is not limited thereto. In another exemplary embodiment, the second pattern 222 may have a length that is less than that of the third pattern 222_2, for example. The second pattern 222 and the third pattern 222_2 may be set to have the same first thickness T1 in a direction perpendicularly crossing the first diagonal direction DDR1.

The second pattern 222 and the third pattern 222_2 may have the same refractive index as each other, and each of the second pattern 222 and the third pattern 222_2 has a refractive index less than that of the first pattern 221_2. Since light passing through the second side S2 to travel to the third side S3 is totally reflected by the interface between the second pattern 222 and the first pattern 221_2 and the interface between the third pattern 222_2 and the first pattern 221_2 to travel upwardly to the display panel 100, the light loss may decrease, and the light efficiency may be improved.

Figure 10:
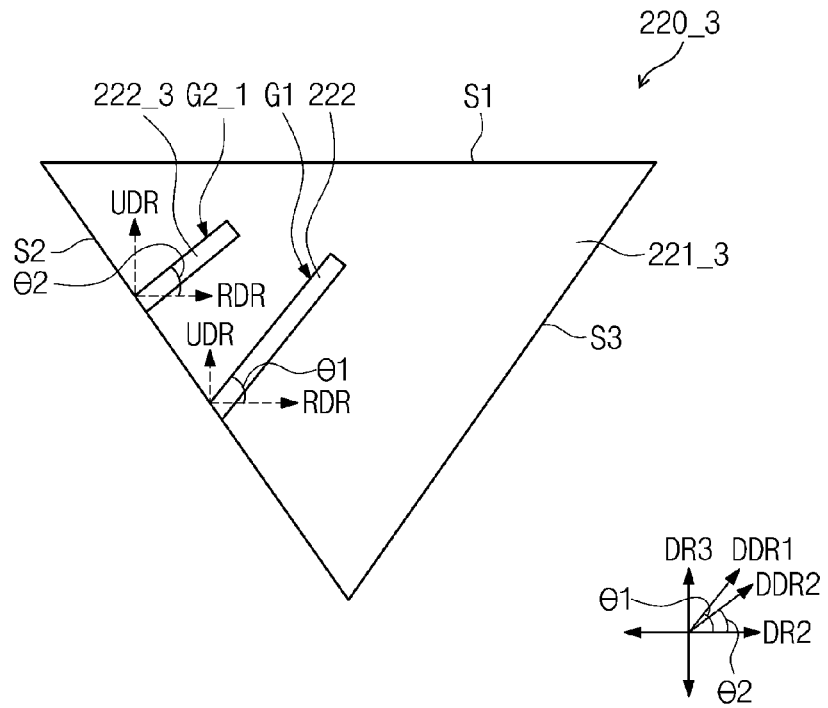

Referring to FIG. 10, the prism pattern 220_3 includes a first pattern 221_3, a second pattern 222 disposed in the first groove G1 defined in the second side S2 of the first pattern 221_3, and a third pattern 222_3 disposed in the second groove G2_1 defined in the second side S2 of the first pattern 221_3.

The first groove G1 and the second pattern 222 have substantially the same configuration as those of the first groove G1 and the second pattern 222 in FIG. 4, respectively. The second groove G2_1 is defined to be recessed to the inside of the first pattern 221_3 from a predetermined area of the second side S2, which is spaced apart from the first groove G1, and the second pattern 222 and the third pattern 222_3 are disposed to be spaced apart from each other.

The second groove G2_1 and the third pattern 222_3 extend in the second diagonal direction DDR2 between the right direction RDR and the upward direction UDR. The second diagonal direction DDR2 extends at a second angle θ2 with respect to the right direction RDR, and the second angle θ2 is an angle less than the right angle that is defined by the right direction RDR and the upward direction UDR.

In an exemplary embodiment, the second angle θ2 may be set to an angle of about 20° to about 80° and also set to an angle different from the first angle θ1. In an exemplary embodiment, the second angle θ2 may be less than the first angle θ1, for example. However, the invention is not limited thereto. In another exemplary embodiment, the second angle θ2 may be greater than the first angle θ1, for example.

The second pattern 222 and the third pattern 222_3 may have the same refractive index as each other, and each of the second pattern 222 and the third pattern 222_3 has a refractive index less than that of the first pattern 221_3. Since light passing through the second side S2 to travel to the third side S3 is totally reflected by the interface between the second pattern 222 and the first pattern 221_3 and the interface between the third pattern 222_3 and the first pattern 221_3 to travel upwardly to the display panel 100, the light loss may decrease, and the light efficiency may be improved.

Figure 11:
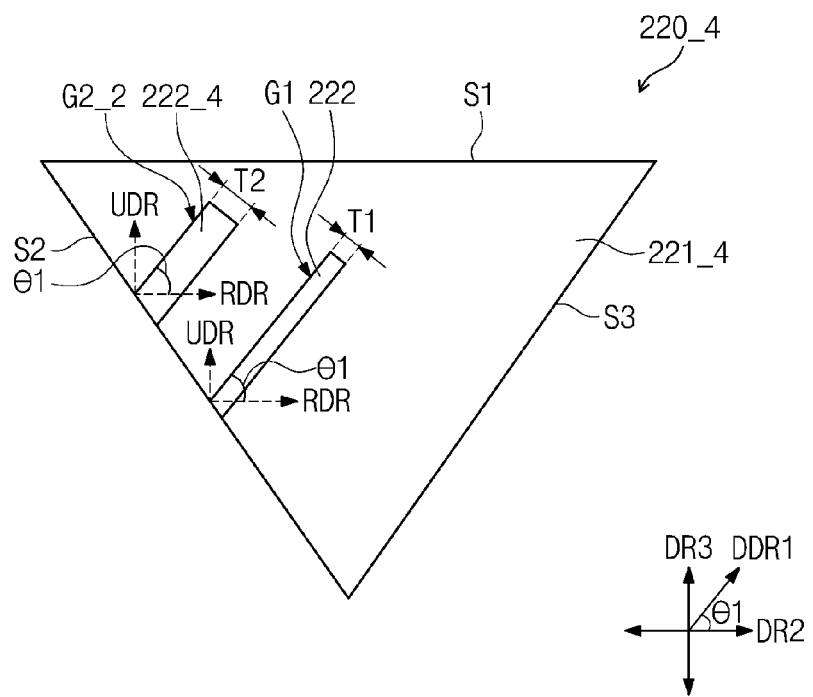

Referring to FIG. 11, the prism pattern 220_4 includes a first pattern 221_4, a second pattern 222 disposed in the first groove G1 defined in the second side S2 of the first pattern 221_4, and the third pattern 222_4 disposed in the second groove G2_2 defined in the second side S2 of the first pattern 221_4. The first groove G1 and the second pattern 222 have substantially the same configuration the first groove G1 and the second pattern 222 in FIG. 4, respectively.

The second groove G2_2 is defined to be recessed to the inside of the first pattern 221_4 from a predetermined area of the second side S2, which is spaced apart from the first groove G1, and the second pattern 222 and the third pattern 222_4 are disposed to be spaced apart from each other. The second groove G2_2 and the third pattern 222_4 extend in the first diagonal direction DDR1 that is directed at the first angle θ1 with the right direction RDR.

The second pattern 222 and the third pattern 222_4 may be set to have thicknesses different from each other in the direction perpendicularly crossing the first diagonal direction DDR1. In an exemplary embodiment, the second pattern 222 may have a first thickness T1 less than the second thickness T2 of the third pattern 222_4 in the direction perpendicularly crossing the first diagonal direction DDR1, for example. However, the invention is not limited thereto. In another exemplary embodiment, the second pattern 222 may have a thickness greater than that of the third pattern 222_4, for example.

The second pattern 222 and the third pattern 222_4 may have the same refractive index as each other, and each of the second pattern 222 and the third pattern 222_4 has a refractive index less than that of the first pattern 221_4. Since light passing through the second side S2 to travel to the third side S3 is totally reflected by the interface between the second pattern 222 and the first pattern 221_4 and the interface between the third pattern 222_4 and the first pattern 221_4 to travel upwardly to the display panel 100, the light loss may decrease, and the light efficiency may be improved.

Figure 12:
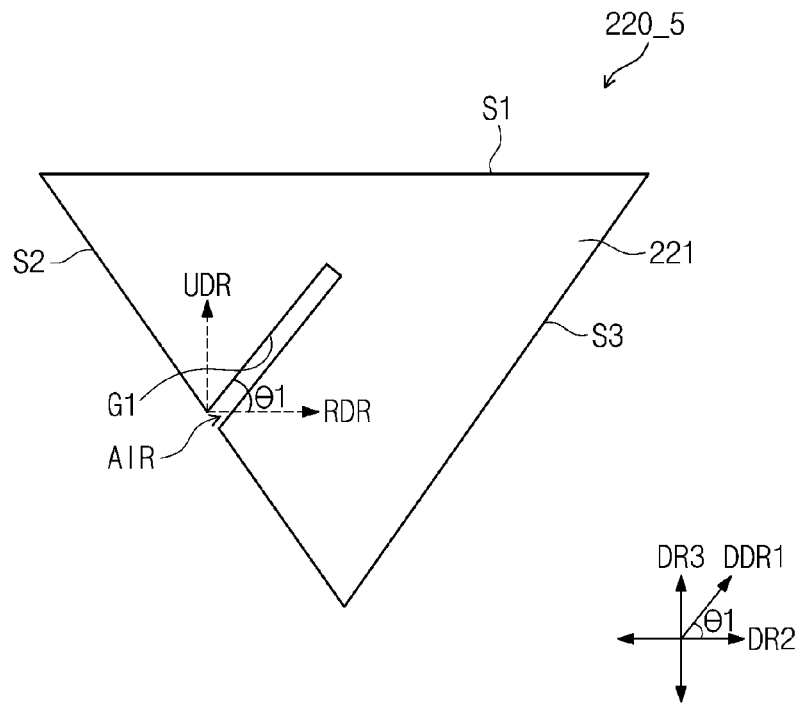

Referring to FIG. 12, the prism pattern 220_5 includes a first pattern 221, and the first pattern 221 of FIG. 12 has the same shape as that of the first pattern 221 of FIG. 4. The prism pattern 220_5 may have the same configuration as that of the prism pattern 220 of FIG. 4 except for the second pattern 222.

An air layer AIR is disposed in the first groove G1. Since the air layer AIR has a refractive index of about 1.0, the air layer AIR disposed in the first groove G1 has a refractive index less than that of the first pattern 221. Since light passing through the second side S2 to travel to the third side S3 is totally reflected by an interface between the air layer AIR and the first pattern 221 to travel upwardly to the display panel 100, the light loss may decrease, and the light efficiency may be improved.

Figure 13:
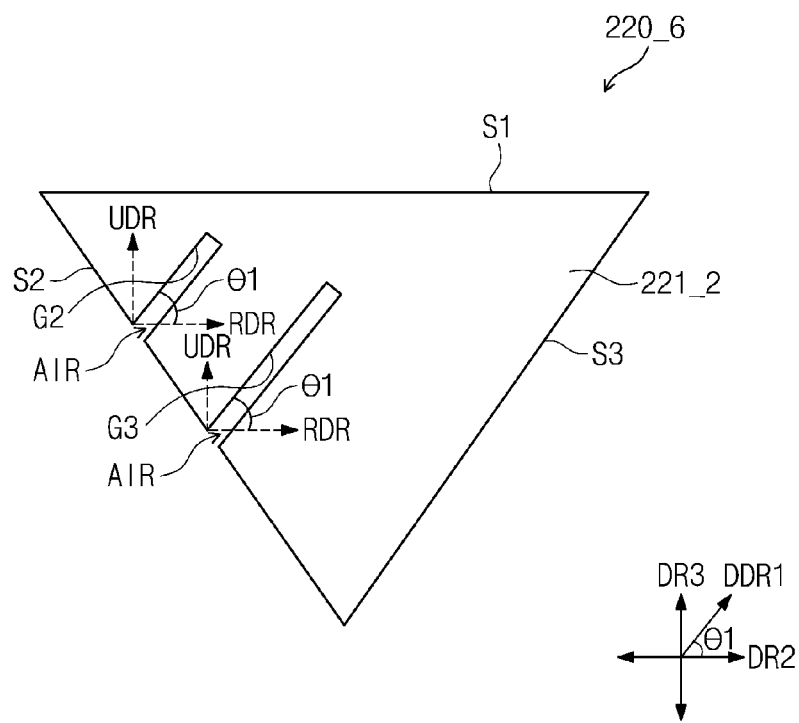

Referring to FIG. 13, the prism pattern 220_6 includes a first pattern 221_2, and the first pattern 221_2 of FIG. 13 has the same shape as that of the first pattern 221_2 of FIG. 9. The prism pattern 220_6 may have the same configuration as that of the prism pattern 220_2 of FIG. 9 except for the second pattern 222 and the third pattern 222_2. Although not shown, the first groove G1 and the second groove G2 may have extension angles and thicknesses, which are different from those of FIG. 10 and FIG. 11.

Air layers AIR are disposed in the first groove G1 and second groove G2, respectively. Each of the air layers AIR respectively disposed in the first groove G1 and second groove G2 has a refractive index less than that of the first pattern 221_2. Since light passing through the second side S2 to travel to the third side S3 is totally reflected by an interface of the air layers AIR disposed in the first groove G1 and second groove G2 and the first pattern 221_2 to travel upwardly to the display panel 100, the light loss may decrease, and the light efficiency may be improved.

Although the exemplary embodiments of the invention have been described, it is understood that various changes and modifications can be made by one ordinary skilled in the art within the spirit and scope of the invention as hereinafter claimed. Also, it is understood that the disclosed exemplary embodiments are not to limit the technical spirit of the invention, rather that the scope of appended claims and all technical sprits within its equivalent scope are included in the protective scope of the invention.

What is claimed is:

1. A display apparatus, comprising:
   a display panel;
   a light guide plate which receives light and guides the received light to the display panel;
   a light source which extends in a first direction, is adjacent to one side surface of the light guide plate in a second direction crossing the first direction, and generates the light; and
   a plurality of prism patterns disposed between the display panel and the light guide plate and each of which has a shape of an inverted triangle in a cross-section,
   wherein each of the plurality of prism patterns comprises:
   a first pattern comprising a first side of the inverted triangle facing the display panel, a second side connecting one end of the first side to a vertex of the inverted triangle, which is disposed under the first side, and a third side connecting another end of the first side to the vertex of the inverted triangle; and
   a second pattern having a refractive index less than that of the first pattern and disposed in a first groove which is defined in the second side to extend in a direction crossing the second side.

2. The display apparatus of claim 1, wherein the plurality of prism patterns extends in the first direction and are arranged in the second direction, each of the plurality of prism patterns has the inverted triangular shape in the cross-section when viewed in the first direction, and the another end of the first side is farther from the light source than the one end of the first side.

3. The display apparatus of claim 2, wherein the second pattern extends in a first diagonal direction between a right direction of the second direction from one side surface of the light guide plate toward another side surface of the light guide plate, which is opposite to the one side surface of the light guide plate, and an upward direction, which is perpendicular to a top surface of the light guide plate and directed from the light guide plate toward the display panel.

4. The display apparatus of claim 3, wherein the first diagonal direction is angled at a first angle with respect to the right direction.

5. The display apparatus of claim 4, wherein the first diagonal direction is set to an angle of about 20° to about 80°.

6. The display apparatus of claim 3, wherein the first groove is defined to be recessed from a predetermined area of the second side toward an inside of the first pattern to extend in the first diagonal direction, and one end of the second pattern in a direction opposite to the first diagonal direction defines the predetermined area of the second side.

7. The display apparatus of claim 3, further comprising a third pattern disposed in a second groove defined to be recessed from a predetermined area, which is spaced apart from the first groove, of the second side toward an inside of the first pattern.

8. The display apparatus of claim 7, wherein the second groove and the third pattern extend in the first diagonal direction, and the second pattern has a length greater than that of the third pattern in the first diagonal direction and a thickness equal to that of the third pattern in a direction crossing the first diagonal direction.

9. The display apparatus of claim 7, wherein the first diagonal direction is angled at a first angle with respect to the right direction, the second groove and the third pattern extend in a second diagonal direction between the right direction and the upward direction, the second diagonal direction is angled at a second angle with respect to the right direction, and the second angle is different from the first angle.

10. The display apparatus of claim 7, wherein the second groove and the third pattern extend in the first diagonal direction, and the second pattern has a thickness different from that of the third pattern in a direction crossing the first diagonal direction.

11. The display apparatus of claim 1, wherein the first pattern is set to a refractive index of about 1.5 to about 1.6, and the second pattern is set to a refractive index of about 1.3 to about 1.4.

12. The display apparatus of claim 1, wherein the first pattern comprises an acrylic resin, and the second pattern comprises an acrylic resin which is softer than the acrylic resin of the first pattern.

13. The display apparatus of claim 1, wherein the display panel comprises:
 a first substrate on which a plurality of pixels is disposed;
 a second substrate on which light conversion layers corresponding to the pixels and a black matrix disposed between the light conversion layers are disposed; and
 a liquid crystal layer between the first substrate and the second substrate.

14. The display apparatus of claim 13, wherein the light conversion layers comprise:
 a plurality of first light conversion layers which convert the light into light having a first color;
 a plurality of second light conversion layers which convert the light into light having a second color; and
 a plurality of light transmission layers which transmit the light therethrough,
 wherein the light has a third color.

15. The display apparatus of claim 14, wherein each of the first light conversion layers comprises:
 a plurality of first quantum dots which convert the light into light having the first color; and
 a first resin which accommodates the first quantum dots, and each of the second light conversion layers comprises:
 a plurality of second quantum dots which convert the light into light having the second color; and
 a second resin which accommodates the second quantum dots.

16. The display apparatus of claim 14, wherein the first color is a red color, the second color is a green color, and the third color is a blue color.

17. The display apparatus of claim 14, wherein the light transmission layers have a thickness greater than that of each of the second light conversion layers, and each of the second light conversion layers has a thickness greater than that of each of the first light conversion layers, and the black matrix has a thickness less than or equal to that of each of the first light conversion layers.

18. A display apparatus, comprising:
 a display panel;
 a light guide plate which receives light and guides the received light to the display panel;
 a light source which extends in a first direction, is adjacent to one side surface of the light guide plate in a second direction crossing the first direction, and generates the light; and
 a plurality of prism patterns disposed between the display panel and the light guide plate, extending in the first direction, arranged in the second direction, and each of which has a shape of an inverted triangle in a cross-section when viewed in the first direction,
 wherein each of the plurality of prism patterns comprises:
 a first pattern comprising a first side of the inverted triangle facing the display panel, a second side connecting one end of the first side to a vertex of the inverted triangle, which is disposed under the first side, and a third side connecting another end of the first side, which is farther from the light source than the one end of the first side, to the vertex of the inverted triangle; and
 a second pattern having a refractive index less than that of the first pattern and disposed in a tunnel defined to pass through a predetermined area of the first side from a predetermined area of the second side,
 wherein the second pattern extends in a first diagonal direction between a right direction of the second direction from one side surface of the light guide plate toward another side surface of the light guide plate, which is opposite to the one side surface of the light guide plate, and an upward direction, which is perpendicular to a top surface of the light guide plate and directed from the light guide plate toward the display panel.

19. A display apparatus, comprising:
 a display panel;
 a light guide plate which receives light and guides the received light to the display panel;
 a light source extending in a first direction and adjacent to one side surface of the light guide plate in a second direction crossing the first direction, the light source generating the light; and
 a plurality of prism patterns disposed between the display panel and the light guide plate, extending in the first direction, arranged in the second direction, and each of which has a shape of an inverted triangle in a cross-section when viewed in the first direction,
 wherein each of the plurality of prism patterns comprises:
 a first pattern comprising a first side of the inverted triangle facing the display panel, a second side connecting one end of the first side to a vertex of the inverted triangle, which is disposed under the first side, and a third side connecting the another end of the first side, which is farther from the light source than the one end of the first side, to the vertex of the inverted triangle, and
 wherein a first groove is defined to be recessed from a predetermined area of the second side toward an inside of the first pattern to extend in a first diagonal direction between a right direction of the second direction from one side surface of the light guide plate toward another side surface of the light guide plate, which is opposite to the one side surface of the light guide plate, and an upward direction, which is perpendicular to a top surface of the light guide plate and directed from the light guide plate toward the display panel.

20. The display apparatus of claim 19, wherein a second groove is defined to be recessed from a predetermined area, which is spaced apart from the first groove, of the second side toward the inside of the first pattern, the second groove extending in the first diagonal direction.

\* \* \* \* \*